US008182141B1

(12) United States Patent
Collins et al.

(10) Patent No.: US 8,182,141 B1
(45) Date of Patent: May 22, 2012

(54) METHOD AND CIRCUIT FOR PROVIDING DISTRIBUTED TEMPERATURE SENSING IN AN INTEGRATED CIRCUIT

(75) Inventors: Anthony J. Collins, Dublin (IE); Juan J. Noguera Serra, Dublin (IE)

(73) Assignee: Xilinx, Inc., San Jose, CA (US)

( * ) Notice: Subject to any disclaimer, the term of this patent is extended or adjusted under 35 U.S.C. 154(b) by 323 days.

(21) Appl. No.: 12/574,442

(22) Filed: Oct. 6, 2009

(51) Int. Cl.
*G01K 11/22* (2006.01)
(52) U.S. Cl. .......................... 374/119
(58) Field of Classification Search .............. 374/119
See application file for complete search history.

(56) References Cited

U.S. PATENT DOCUMENTS

| | | | | |
|---|---|---|---|---|
| 5,795,068 | A * | 8/1998 | Conn, Jr. ................. | 374/170 |
| 7,044,633 | B2 * | 5/2006 | Clabes et al. .............. | 374/1 |
| 7,138,320 | B2 | 11/2006 | van Bentum et al. | |
| 7,235,999 | B2 * | 6/2007 | Goetting et al. ............ | 326/9 |
| 7,463,096 | B2 * | 12/2008 | Chi et al. .................. | 331/2 |
| 7,616,026 | B2 * | 11/2009 | Balasubramanian et al. | 326/38 |
| 7,742,887 | B2 * | 6/2010 | Patel et al. ................ | 702/75 |
| 2003/0034848 | A1 * | 2/2003 | Norman et al. ............. | 331/46 |
| 2005/0157593 | A1 * | 7/2005 | King et al. ................ | 368/113 |
| 2011/0074394 | A1 * | 3/2011 | Gebara et al. ............. | 324/104 |
| 2011/0090015 | A1 * | 4/2011 | Sumita et al. ............. | 331/56 |
| 2011/0102064 | A1 * | 5/2011 | Noorlag et al. ............ | 327/524 |

OTHER PUBLICATIONS

Lopez-Buedo, S. et al., "Thermal Testing on Reconfigurable Computers", Universidad Autonoma de Madrid, IEEE Design & Test of Computers, vol. 17, Issue 1, Jan.-Mar. 2000, pp. 84-91.
Sundararajan, P. et al., "Thermal Characterization and Optimization in Platform FPGAs", IEEE/ACM International Conference on Computer-Aided Design ICCAD 06, Nov. 5-9, 2006, 5 pages.
Gochman, S. et al., "Introductions to Intel Core Duo Processor Architecture", Mobility Group, Intel Corporation vol. 10, Issue 02, May 15, 2006, pp. 89-98.
Xilinx, Inc., "Virtex-5 System Monitor", User Guide, UG192 (v1.2) Oct. 4, 2007, 60 pages.

* cited by examiner

*Primary Examiner* — Lisa Caputo
*Assistant Examiner* — Jamel Williams
(74) *Attorney, Agent, or Firm* — Kin-Wah Tong

(57) ABSTRACT

In one embodiment, an integrated circuit for providing distributed temperature sensing is disclosed. For example, the integrated circuit comprises a plurality of circuit components, an internal temperature sensing device deployed among the plurality of circuit components; and a plurality of ring-oscillators deployed among the plurality of circuit components, wherein at least one of the plurality of ring-oscillators is deployed adjacent to the internal temperature sensing device, where the plurality of ring-oscillators is used to provide one or more temperature measurements, e.g., a temperature gradient, for the integrated circuit.

20 Claims, 2 Drawing Sheets

METHOD AND CIRCUIT FOR PROVIDING DISTRIBUTED TEMPERATURE SENSING IN AN INTEGRATED CIRCUIT

FIELD OF THE INVENTION

This invention relates generally to integrated circuits, and in particular, to a circuit and method for providing distributed temperature sensing.

BACKGROUND OF THE INVENTION

Temperature is a growing concern in most integrated circuits (ICs). Die temperature should be controlled because temperature impacts the timing, leakage power, package design, and life-time of the IC device. For example, integrated circuits will run slower when they are hot, and their life-time will be reduced exponentially with increasing temperature. Furthermore, leakage power increases exponentially with temperature, which can cause a thermal runaway. The problem is further exacerbated by increasing power densities. As semiconductor technology continues to improve, it is possible to implement circuits in ever higher power density.

Programmable logic devices (PLDs) have by their nature resulted in lower power density at the same process nodes when compared to application specific integrated circuits (ASICs) and microprocessors. However, the recently high performance hard macros, such as a processor core or a power PC (broadly referred to as non-programmable dedicated components) have been embedded in PLDs which have the potential to induce localized heating and hot spots. Furthermore, because the customer design is unknown, it is very difficult to ascertain the temperature gradient at the user selected regions of the design.

One can use an external temperature measuring device, e.g., an external thermocouple, to measure the temperature of the die, but such approach is impractical and inefficient in that external equipment will be needed. Furthermore, there may be variations from die to die, thereby affecting the accuracy as to how temperature is correlated. Additionally, if the IC is a PLD, the temperature gradient can only be ascertained after the design has been implemented by the customer. Finally, once the IC is fielded into a piece of equipment, it is often impractical to monitor the temperature gradient during run time.

SUMMARY OF THE INVENTION

In one embodiment, an integrated circuit for providing distributed temperature sensing is disclosed. In this embodiment, the integrated circuit comprises: a plurality of circuit components, an internal temperature sensing device deployed among the plurality of circuit components; and a plurality of ring-oscillators deployed among the plurality of circuit components, where at least one of the plurality of ring-oscillators is deployed adjacent to the internal temperature sensing device, where the plurality of ring-oscillators is used to provide one or more temperature measurements for the integrated circuit.

An embodiment of a method for providing a distributed temperature sensing for an integrated circuit comprises: deploying a plurality of ring oscillators onto the integrated circuit; generating a transfer function internally from the integrated circuit; and applying the transfer function to obtain one or more temperature measurements for the integrated circuit.

Another embodiment of an integrated circuit comprises: a plurality of circuit components, and an internal temperature sensing device deployed among the plurality of circuit components, where the internal temperature sensing device provides a first temperature measurement in a first mode of operation and a second temperature measurement in a second mode of operation. In addition, the integrated circuit also includes: a plurality of ring-oscillators deployed among the plurality of circuit components, where a particular one of the plurality of ring-oscillators is deployed adjacent to the internal temperature sensing device, where the particular one of the plurality of ring-oscillators provides a first frequency control value in the first mode of operation and a second frequency control value in the second mode of operation, and a processor to generate a transfer function using the first temperature measurement, the second temperature measurement, the first frequency control value, and the second frequency control value.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Figure 1:
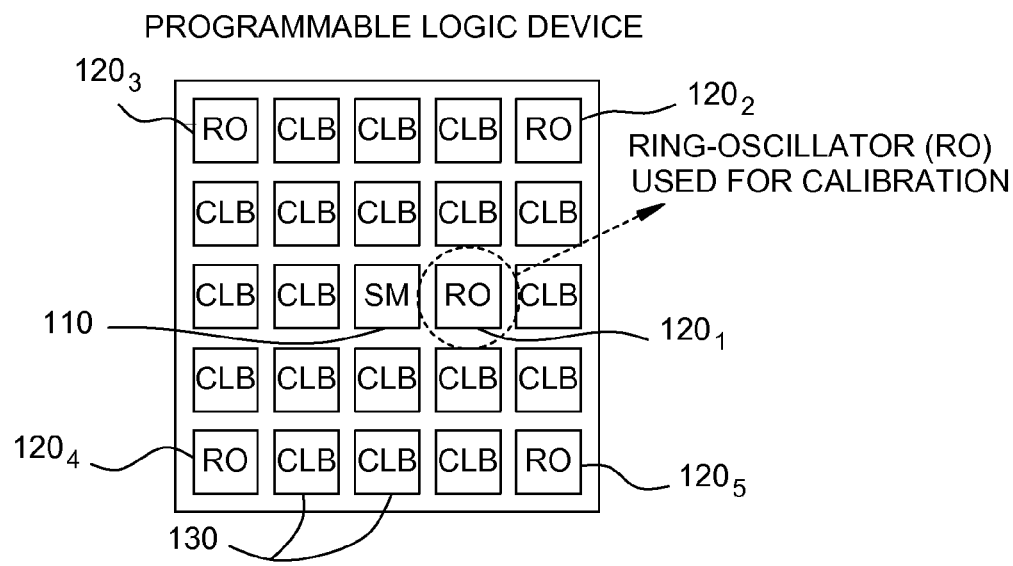
FIG. 1 illustrates a block diagram of an IC employing a distributed temperature sensing architecture according to an embodiment of the present invention.

FIG. 1 illustrates a block diagram of an IC 100 employing a distributed temperature sensing architecture according to an embodiment of the present invention. In one embodiment, the IC 100 is, e.g., a programmable logic device. Although the present invention is disclosed in the context of a PLD, it should be noted that one or more aspects of the present invention relate generally to an integrated circuit (IC). Namely, any type of ICs can be adapted to implement the present invention.

More specifically, in one embodiment, one or more aspects of the present invention relate generally to a programmable logic device. A programmable logic device (PLD) is a general-purpose device that can be programmed by a user to implement a variety of selected functions. One type of PLD is a Field Programmable Gate Array (FPGA), which typically includes an array of configurable logic blocks (CLBs) and a plurality of input/output blocks (IOBs). The CLBs are individually programmable and can be configured to perform a variety of logic functions on a few input signals. The IOBs can be configured to drive output signals from the CLBs to external pins of the FPGA and/or to receive input signals from the external FPGA pins. The FPGA also includes a programmable interconnect structure that can be programmed to selectively route signals among the various CLBs and IOBs to produce more complex functions of many input signals. The CLBs, IOBs, and the programmable interconnect structure are programmed by loading configuration data into associated memory cells that control various switches and multiplexers within the CLBs, IOBs, and the interconnect structure to implement logic and routing functions specified by the configuration data to implement a user design in the FPGA. An FPGA may also include other programmable and non-programmable resources.

In one embodiment, FIG. 1 illustrates a PLD 100 having a system monitor (SM) 110, a plurality of ring-oscillators (ROs) $120_{1-5}$ and a plurality of circuit components, e.g., CLBs 130. For brevity, it should be noted that the PLD 100 is only illustrated as having CLBs, but those skilled in the art will realize that a PLD comprises more than CLBs as discussed above. The CLBs are only provided to illustrate various circuit components or modules that can be programmed to perform a particular circuit function. Alternatively, if the present invention is adapted into a non-programmable device, then the CLBs can broadly represent other embedded circuit components or modules within the IC.

To address the temperature sensing problem, the present invention employs a distributed temperature sensing architecture that employs a plurality of ring-oscillators $120_{1-5}$ and the like. Although the present invention is disclosed in the context of ring oscillators, it should be noted that similar devices can be adapted to the present invention. In one embodiment, the ring-oscillators are implemented using the CLBs of the PLD. The ring oscillators generate a clock frequency which drives a counter to finally obtain a number, which is then calibrated to a temperature that is read using an internal temperature sensing device, e.g., system monitor 120. In one embodiment, the system monitor 110 is disclosed in U.S. Pat. No. 7,138,820 and U.S. Pat. No. 7,235,999, which are herein incorporated by reference. Broadly, the internal temperature sensing device can be implemented using an analog to digital (A/D) converter that is coupled to one or more analog sensors that are capable of measuring physical parameters of the IC, e.g., temperature, power supply voltage, and the like. As such, although FIG. 1 illustrates the use of a system monitor 110, the present invention is not so limited. In other words, any internal temperature sensing devices capable of performing the temperature measurement as disclosed in the present disclosure can be adapted into the present invention.

In one embodiment, the present disclosure presents a distributed temperature sensing architecture on a programmable logic device which uses several ring-oscillators calibrated using the internal system monitor block. One objective is to provide the capability to take local temperature measurements or to measure the temperature gradient (i.e., a difference in temperature between different locations) across the die internally without the use of any external measuring device at design time and/or run time.

In one embodiment, the present invention places at least one ring-oscillator next to (e.g., adjacent or spatially proximate to) the system monitor block, e.g., the system monitor block is itself deployed substantially at a central location of the integrated circuit. The operation of the present distributed temperature sensing architecture comprises two modes of operation: 1) a calibration-mode, and 2) a functional-mode.

In one embodiment, during the calibration-mode, all modules in the integrated circuit or design are caused to be non-operational (e.g., reset or clock-gated). For example, the integrated circuit 100 can be placed into a "sleep mode", where the only working module is the ring-oscillator $120_1$ (shown as being circled in FIG. 1) placed next to system monitor 110. Whereas, during the functional-mode, all modules in the integrated circuit or design are operational.

With the integrated circuit or design in calibration-mode, the ring oscillator $120_1$ next to system monitor 110 is enabled for a short period of time and the output value (CRO-A) of the ring-oscillator counter is read and stored. Similarly, at the same time the output value of the RO is read, the temperature (TSM-A) measured by the system monitor is also read and stored. In doing so, during the calibration-mode an initial ratio of frequency counter value of the RO $120_1$ is associated with a temperature reading performed by the system monitor 110.

In one alternate embodiment, a plurality of ring-oscillator counters can be read and stored during the calibration mode. In other words, one can assume that the integrated circuit has a substantially uniform temperature gradient during the sleep mode. As such, a plurality of output values of the plurality of ring-oscillator counters can be read and stored. In turn, an average of the read values can be taken to represent the counter value for the initial data point of the transfer function as further discussed below. Additionally, weights can be applied to the plurality of output values, e.g., a highest weight is given to the RO immediately next to the system monitor, and progressively lower weights can be given to ROs that are deployed further away from the system monitor.

Next, the integrated circuit or design is changed to the functional-mode or a higher power mode of operation. After a time, another temperature measurement and frequency measurement are made using the same ring-oscillator and system monitor. It is assumed that the temperature will increase given that all the other modules on the integrated circuit or design are now operating thereby generating heat. Thus, the present invention will obtain two new values CRO-B and TSM-B.

In one embodiment, using these four values (CRO-A, TSM-A, CRO-B, TSM-B), it is possible to calibrate the ring oscillator $120_1$ next to the system monitor 110. More specifically, a transfer function can be calculated from the four values to arrive at a transfer function that is linear (e.g., a straight line) for the ring-oscillator. Although four values are used above to arrive at a linear transfer function, the present invention is not so limited. For example, one can obtain more than four values and calculate a transfer function that may not be linear, (e.g., a curve line) for the ring-oscillator. In one embodiment, the transfer function is calculated by a processor (e.g., a processor 402 shown in FIG. 4). Alternatively, the transfer function can be calculated by other circuit components that are deployed within the integrated circuit (e.g., a state machine) or that are external to the integrated circuit, and the transfer function is then provided to the system monitor 110.

In one embodiment, assuming that the slope will be the same for all other ring-oscillators $120_{2-5}$ placed in the integrated device 100, e.g., at the edge of the integrated device as shown in FIG. 1, it is possible to obtain the temperature across the die by reading the counter output of the different ring-oscillators. In one embodiment, the temperature is deduced from the frequency delta instead of the absolute ring-oscillator frequency.

It should be noted that although FIG. 1 illustrates the additional ROs $120_{2-5}$ as being deployed at the edge or corner of the integrated device 100, the present invention is not so limited. Namely, the ROs 120 can be deployed in any locations on the integrated circuit that will provide insight into the local temperature measurements or temperature gradient of the integrated circuit.

Figure 2:
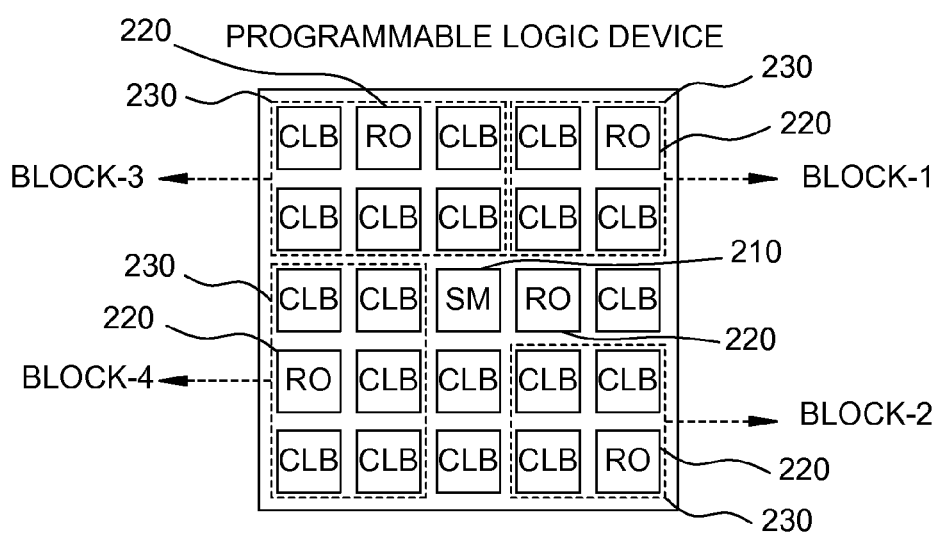
FIG. 2 illustrates a block diagram of an IC employing a distributed temperature sensing architecture according to an alternate embodiment of the present invention.

FIG. 2 illustrates a block diagram of an IC 200 employing a distributed temperature sensing architecture according to an alternate embodiment of the present invention. Unlike the IC 100 of FIG. 1, the IC 200 is illustrated as having a plurality of modules or blocks of functions 230 (e.g., Block-1-4). In other words, the integrated circuit 200 is segmented into a plurality of modules 230. For example, modules may include a memory controller, a soft processor and the like. In one embodiment, at least one ring-oscillator 220 is deployed within each module 230. Furthermore, IC 200 also employs a system monitor 210 with a neighboring ring-oscillator 220 as well.

In one embodiment, by deploying one RO for each module, the present distributed temperature sensing architecture will be able to broadly provide a temperature measurement (or more specifically, a temperature gradient) of the integrated device on a per module basis. This approach will provide additional insight as to which module is experiencing a temperature spike relative to other modules employed on the same integrated circuit 200.

In addition to the ability of deducing the temperature, e.g., a temperature gradient, of an integrated circuit without the need to use external temperature measuring device, the present invention provides other advantages. First, the present distributed temperature sensing architecture can be deployed at design time or at run time. For example, at design time, the user can predefine that a RO will be deployed in each module as discussed above in FIG. 2. Thus, a designer will be able to obtain the temperature gradient during the design of the integrated circuit, where the ROs can be left in the design of the integrated circuit.

Alternatively, the RO can be deployed during run time by the user. For example, a user can arbitrarily insert ROs into the PLD after the design has been finalized. In other words, if there are CLBs that are still available on the PLD, then ROs can be programmed into the PLD at a later time after the design time. This provides flexibility to the user of the PLD.

Another advantage of the present distributed temperature sensing architecture is the ability to use the internally measured temperature, e.g., a temperature gradient, as a control input while the integrated circuit is operating. For example, the internally measured temperature can be provided to an internal controller, e.g., a system monitor, a processor core, or a processor such as the PowerPC® available from International Business Machines ("IBM®") Corporation of Armonk, N.Y.; the controller can be located on the integrated circuit. This will allow the internal controller to detect any potentially harmful temperature spike at a particular location on the integrated circuit. For example, if a memory controller is operating at a high speed that is causing a temperature spike, then the internal controller can selectively slow down the memory controller to reduce the temperature at the memory controller and so on.

Figure 3:
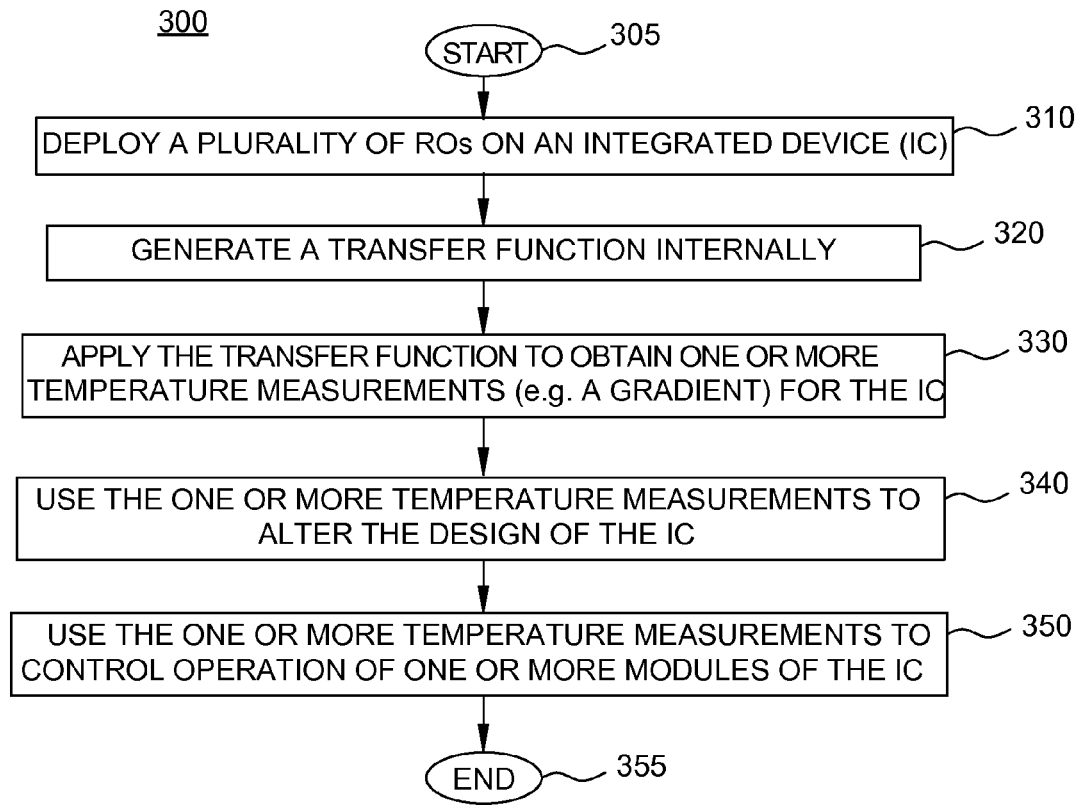
FIG. 3 illustrates a block diagram of a method of providing distributed temperature sensing for an integrated circuit according to an embodiment of the present invention.

FIG. 3 illustrates a block diagram of a method 300 of providing distributed temperature sensing for an integrated circuit according to an embodiment of the present invention. Method 300 starts at step 305 and proceeds to step 310.

In step 310, a plurality of ring-oscillators is deployed on an integrated circuit. For example, in one embodiment, the plurality of ring-oscillators can be deployed in an arbitrary manner (e.g., edges and corners) or uniformly distributed across the integrated circuit (e.g., based on a uniform distance separating the ROs). Alternatively, the plurality of ring-oscillators can be deployed in a manner where each module comprises a separate RO. As discussed above, the plurality of ring-oscillators can be deployed at design time or at run time.

In step 320, a transfer function is generated. As discussed above, a minimum of four values will be needed to generate a linear transfer function using a system monitor and a neighboring RO. In one embodiment, both the system monitor and the neighboring RO are deployed internally in the integrated circuit. However, additional values can be measured to obtain a potentially more accurate transfer function that is non-linear.

In step 330, the transfer function is used to obtain a temperature measurement, e.g., a temperature gradient, for the integrated circuit. For example, additional ROs deployed throughout the integrated circuit are used to measure a localized temperature reading via a respective frequency counter value.

In optional step 340, the temperature gradient can be used to evaluate the design or layout of the integrated circuit at design time. For example, temperature spikes that are deemed to be unacceptable will be detected and the module or function that contributed to the unacceptable temperature spike can be altered.

In optional step 350, the temperature gradient can be used to control various modules or functions of the integrated circuit at run time. For example, temperature spikes that are deemed to be unacceptable will be detected and the operations of relevant modules or functions that contributed to the unacceptable temperature spike can be altered, e.g., decreasing the operating speed of a particular module and so on.

It should be noted that although not specifically specified, one or more steps of method 300 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 3 that recite a determining operation or involve a decision, do not necessarily require that both branches of the determining operation be practiced. In other words, one of the branches of the determining operation can be deemed as an optional step.

Figure 4:
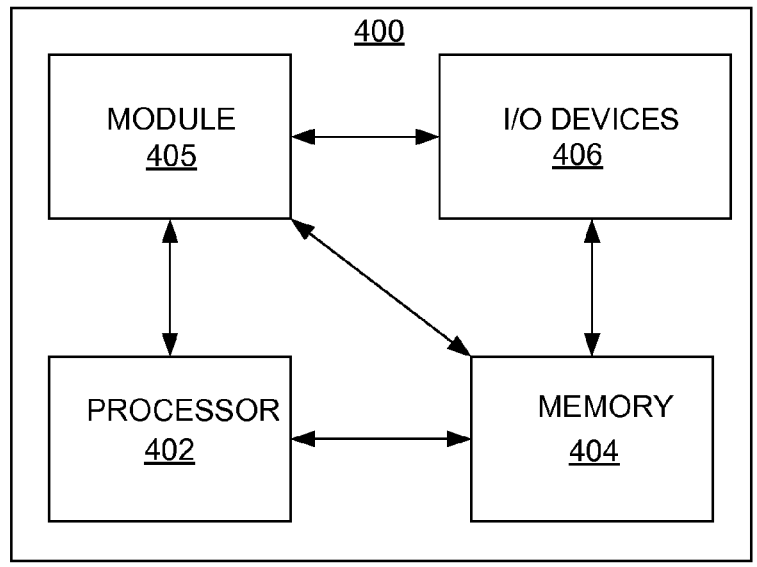
FIG. 4 illustrates a high level block diagram of a general purpose computer or a computing device suitable for use in performing the functions described herein.

FIG. 4 depicts a high level block diagram of a general purpose computer or a computing device suitable for use in performing some or all of the functions described herein. As depicted in FIG. 4, the system 400 comprises a processor element 402 (e.g., a CPU), a memory 404, e.g., random access memory (RAM) and/or read only memory (ROM), a module 405 for providing distributed temperature sensing for an integrated circuit, and various input/output devices 406 (e.g., storage devices, including but not limited to, a memory device, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

Embodiments of the present invention can be implemented in software and/or in a combination of software and hardware, e.g., using application specific integrated circuits (ASIC), a general purpose computer or any other hardware equivalents such as microprocessors. In one embodiment, the present module or process for providing distributed temperature sensing for an integrated circuit can be loaded into memory 404 and executed by processor 402 to implement the functions as discussed above. As such, the present module or process 405 for providing distributed temperature sensing for an integrated circuit (including associated data structures) of embodiments of the present invention can be stored on a computer readable medium, e.g., RAM memory, magnetic or optical drive or diskette and the like.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof.

Claim(s) listing steps do not imply any order of the steps. Trademarks are the property of their respective owners.

What is claimed is:

1. An integrated circuit, comprising:
   a plurality of circuit components;
   an internal temperature sensing device deployed among said plurality of circuit components; and
   a plurality of ring-oscillators deployed among said plurality of circuit components, wherein at least one of said plurality of ring-oscillators is deployed adjacent to said internal temperature sensing device and is an only one of the plurality of circuit components used for calibrating said internal temperature sensing device, wherein said plurality of ring-oscillators is used to provide one or more temperature measurements for the integrated circuit.

2. The integrated circuit of claim 1, wherein said plurality of circuit components comprises embedded circuit components.

3. The integrated circuit of claim 1, wherein said internal temperature sensing device comprises an analog to digital (A/D) converter that is coupled to one or more analog sensors.

4. The integrated circuit of claim 1, wherein each of said plurality of ring-oscillators comprises a frequency counter.

5. The integrated circuit of claim 4, wherein a first output value is obtained from said at least one of said plurality of ring-oscillators that is deployed adjacent to said internal temperature sensing device, and a first temperature measurement is obtained from said internal temperature sensing device during a calibration mode.

6. The integrated circuit of claim 5, wherein a second output value is obtained from said at least one of said plurality of ring-oscillators that is deployed adjacent to said internal temperature sensing device, and a second temperature measurement is obtained from said internal temperature sensing device during a functional mode.

7. The integrated circuit of claim 6, wherein a transfer function is derived from said first output value, said second output value, said first temperature measurement, and said second temperature measurement.

8. The integrated circuit of claim 7, wherein said transfer function is a linear transfer function.

9. The integrated circuit of claim 6, wherein a third output value is obtained from said at least one of said plurality of ring-oscillators that is deployed adjacent to said internal temperature sensing device, and a third temperature measurement is obtained from said internal temperature sensing device.

10. The integrated circuit of claim 9, wherein said transfer function is a non-linear transfer function.

11. The integrated circuit of claim 7, wherein said transfer function is used to obtain said one or more temperature measurements.

12. The integrated circuit of claim 1, wherein said integrated circuit comprises a programmable logic device (PLD), and said plurality of circuit components comprises a plurality of configurable logic blocks (CLBs).

13. The integrated circuit of claim 12, wherein one or more of said plurality of configurable logic blocks are grouped into one or more modules, wherein at least one of said plurality of ring-oscillators is deployed within each of said one or more modules.

14. The integrated circuit of claim 1, wherein said plurality of ring-oscillators is deployed at design time.

15. The integrated circuit of claim 1, wherein said plurality of ring-oscillators is deployed at run time.

16. The integrated circuit of claim 1, wherein said one or more temperature measurements comprise a temperature gradient.

17. A method for providing a distributed temperature sensing for an integrated circuit, comprising:
    deploying a plurality of ring oscillators onto said integrated circuit;
    generating a transfer function internally from said integrated circuit; and
    applying the transfer function to obtain one or more temperature measurements for the integrated circuit,
    wherein at least one of said plurality of ring oscillators is an only one of the plurality of circuit components used for calibrating a system for providing the distributed temperature sensing and is deployed adjacent to an internal temperature sensing device.

18. The method of claim 17, further comprising:
    using said one or more temperature measurements to alter a design of said integrated circuit.

19. The method of claim 17, further comprising:
    using said one or more temperature measurements to control one or more modules of said integrated circuit.

20. An integrated circuit, comprising:
    a plurality of circuit components;
    an internal temperature sensing device deployed among said plurality of circuit components, wherein said internal temperature sensing device provides a first temperature measurement in a first mode of operation and a second temperature measurement in a second mode of operation;
    a plurality of ring-oscillators deployed among said plurality of circuit components, wherein a particular one of said plurality of ring-oscillators is deployed adjacent to said internal temperature sensing device and is an only one of the plurality of circuit components used for calibrating said internal temperature sensing device, wherein said particular one of said plurality of ring-oscillators provides a first frequency control value in the first mode of operation and a second frequency control value in the second mode of operation; and
    a processor to generate a transfer function using the first temperature measurement, the second temperature measurement, the first frequency control value, and the second frequency control value.

* * * * *